United States Patent [19]
Kao et al.

[11] Patent Number: 5,980,731
[45] Date of Patent: Nov. 9, 1999

[54] NAPHTHA REFORMING CATALYST AND PROCESS

[75] Inventors: Jar-Lin Kao; Scott A. Ramsey, both of Houston, Tex.

[73] Assignee: Exxon Chemical Patents Inc., Houston, Tex.

[21] Appl. No.: 08/965,714

[22] Filed: Nov. 7, 1997

[51] Int. Cl.⁶ .................................................. C10G 35/04
[52] U.S. Cl. .......................................... 208/137; 208/134
[58] Field of Search .................................... 208/134, 137

[56] References Cited

U.S. PATENT DOCUMENTS

| | | | |
|---|---|---|---|
| 4,568,656 | 2/1986 | Poeppelmeier et al. | 502/74 |
| 4,595,669 | 6/1986 | Fung et al. | 502/74 |
| 4,839,320 | 6/1989 | Trowbridge et al. | 502/66 |
| 4,897,177 | 1/1990 | Nadler | 208/79 |
| 4,914,068 | 4/1990 | Cross et al. | 502/74 |
| 4,987,109 | 1/1991 | Kao et al. | 502/66 |
| 5,051,387 | 9/1991 | Koetsier et al. | 502/74 |
| 5,242,675 | 9/1993 | Verduijn | 423/700 |
| 5,476,823 | 12/1995 | Beck et al. | 502/60 |
| 5,486,498 | 1/1996 | Verduijn | 502/66 |
| 5,491,119 | 2/1996 | Verduijn | 502/74 |

FOREIGN PATENT DOCUMENTS

| | | | |
|---|---|---|---|
| 0 142 351 | 5/1985 | European Pat. Off. | B01J 29/32 |
| 0 142 351 A1 | 5/1985 | European Pat. Off. | |
| 0 142 352 | 5/1985 | European Pat. Off. | B01J 29/38 |
| 0 142 352 A2 | 5/1985 | European Pat. Off. | |
| 0 201 856 | 11/1986 | European Pat. Off. | B01J 29/32 |
| 0 201 856 A1 | 11/1986 | European Pat. Off. | |
| 0498182 | 1/1992 | European Pat. Off. | |
| 0 498 182 | 8/1992 | European Pat. Off. | C10G 35/095 |
| 0 498 182 A1 | 8/1992 | European Pat. Off. | |
| 94/05419 | 3/1994 | WIPO . | |

*Primary Examiner*—Helane Myers
*Attorney, Agent, or Firm*—Edward F. Sherer

[57] ABSTRACT

The invention provides a crystalline type L zeolite reforming catalyst comprising cylindrically shaped crystals having a length of 0.6 microns or less and an average length: diameter ratio of less than about 0.5, the catalyst containing at least one Group VIII metal and from about 0.1 to 2 wt % halogen e.g., chlorine. Also provided is a method for activating or regenerating the catalyst wherein a fresh or de-coked catalyst is oxychlorinated, purged to remove excess chlorine and reduced. The catalysts are particularly useful for the reforming of $C_6$ to $C_{11}$ naphthas to produce reformates having a high content of $C_6$ to $C_8$ light aromatics and a reduced content of heavier $C_9$ and $C_{10}$ aromatics.

18 Claims, 1 Drawing Sheet

5,980,731

NAPHTHA REFORMING CATALYST AND PROCESS

BACKGROUND OF THE INVENTION

1. Field of the Invention

The invention relates to zeolite L-based reforming catalysts and their use to produce reformate having a lower content of $C_9$ and $C_{10}$ aromatic compounds.

2. Description of Related Art

Catalytic reforming is a major petroleum refining process used to raise the octane rating of naphthas ($C_6$ to $C_{11}$ hydrocarbons) for gasoline blending. Catalytic reforming is also a principal source of aromatic chemicals, i.e., benzene, toluene and xylenes, via conversion of paraffins and naphthenes to aromatics.

The principal reforming chemical reactions are dehydrogenation of cyclohexane to aromatics, dehydro-cyclization of paraffins to aromatics, dehydroisomerization of alkylcyclopentanes to aromatics, isomerization of normal paraffins to branched paraffins, dealkylation of alkylbenzenes, and hydrocracking of paraffins to light hydrocarbons. The hydrocracking of paraffins to light hydrocarbons is undesirable and should be minimized because light hydrocarbons have low value.

Catalysts commonly used in commercial reformers include a Group VIII metal, such as platinum, or platinum plus a second catalytic metal, such as rhenium or iridium, dispersed on an alumina substrate. Typically, chlorine is incorporated on the alumina to add acid functionality. Alumina-based reforming catalysts are suitable for aromatizing $C_{8+}$ paraffins, but are less effective for aromatizing $C_6$ to $C_8$ paraffins because these catalysts hydrocrack more of the lighter paraffins to low value fuel gas than they convert to aromatics.

Conventional reforming catalysts are bifunctional, i.e., the catalysts enhance i) dehydrogenation and cyclization reactions on the catalytic metal sites; and ii) isomerization on separate strong acid sites in the catalyst. The undesirable hydrocracking reactions also occur on the acid sites.

Within the past few years reforming catalysts have been developed which have been discovered to be particularly effective for aromatizing the $C_6$ to $C_8$ paraffin components of naphtha. These catalysts are made using zeolite, rather than alumina, as the support for the catalytic metal. They are mono-functional and contain relatively few strong acid sites. Unlike conventional bifunctional catalysts, zeolite based catalysts accomplish dehydrogenation and cyclization reactions as well as isomerization on the dispersed metallic catalytic sites. Because these zeolite-based catalysts have few strong acid sites, undesirable hydrocracking reactions are repressed. Zeolites which are preferred for reforming catalysts are large pore zeolites i.e., zeolites with a 6 to 15 Angstrom pore diameter. Zeolite L is the most preferred support for reforming catalysts, particularly wherein the catalytically active metal is platinum. Examples of such catalysts are disclosed in U.S. Pat. Nos. 4,104,320 and 4,544,539.

Modified versions of these Group VIII metal-containing catalysts which also contain an ion-exchanged alkaline earth metal such as calcium, barium or strontium are disclosed in U.S. Pat. No. 4,435,283. This catalyst is disclosed to have a higher selectivity with respect to the dehydrocyclization of alkanes such as n-hexane into aromatics.

More recently, zeolite L crystallites having a cylindrical structure and shorter channel length have been developed which provide for improved run lengths, conversion and selectivity towards aromatics production when used as a catalyst support in a reforming process. These crystallites may be characterized as "coin" or "hockeypuck" shaped and have a relatively large diameter and short length. The "length" of a crystal is a measurement of the outer edge of the crystal perpendicular to the basal plane containing the diameter. The length is typically 0.1 to 0.6, preferably 0.1 to 0.3 microns and the diameter is generally 0.3 to 1.5 microns, preferably 0.4 to less than 1.0 micron. When the length/diameter ratio is 0.2 to 0.5, the crystal shape is termed "hockeypuck". When this ratio is less than 0.2, the shape is termed "coin".

These new zeolites are synthesized by hydrothermal treatment of a synthesis mixture containing water, a source of potassium, a source of $Al_2O_3$, a source of $SiO_2$ and up to about 0.1 wt %, based on the synthesis mixture, of a source of a divalent cation selected from the group consisting of magnesium, calcium, barium, manganese, chromium, cobalt, nickel and zinc. The divalent cation present in the synthesis mixture serves to reduce the size and regulate the shape of the resulting zeolite L crystallites and also suppresses the formation of unwanted impurities such as zeolite W.

These zeolites and platinum-loaded versions thereof used as reforming catalysts are disclosed in U.S. Pat. Nos. 5,486,498 and 5,491,119, the complete disclosures of which patents are incorporated herein by reference.

One of the primary goals in a naphtha reforming process is to achieve a reformate which contains a high content of aromatics because these chemicals are more valuable and contribute to higher octane values where the reformate is used in the gasoline product pool. Present requirements of the U.S. Clean Air Act and the physical and compositional limitations imposed by the Reformulated Gasoline (RFG) and U.S. EPA Complex Model regulations will result in limitations on gasoline boiling range, typically measured by minimum Reid Vapor Pressure (RVP) and $T_{90}$ specification. What this means is that reformates containing a higher content of lighter aromatics, e.g., benzene, toluene and xylene (BTX) are more valuable for use in reformulated gasoline than reformates wherein the aromatics content also includes significant amounts of heavier $C_9$ and $C_{10}$ aromatics.

Accordingly, it is an object of the invention to provide a fresh or regenerated Group VIII metal-containing zeolite L catalysts which is highly selective to the production of aromatics containing lesser amounts of $C_9$ and $C_{10}$ aromatics.

Another object of the invention is to provide a process for reforming naphtha streams using this catalyst, as well as activated and regenerated versions thereof.

Still another object of the invention is to provide a process for further activating or regenerating this catalyst.

SUMMARY OF THE INVENTION

The invention provides a crystalline type L zeolite catalyst in which the crystals are cylindrical and have an average length of 0.6 microns or less and an average length: diameter ratio of less than about 0.5, said catalyst containing at least one catalytically active Group VIII metal of the Periodic Table and from about 0.1 to 2 wt % of halogen.

The invention also provides a process for reforming a $C_6$ to $C_{11}$ naphtha stream containing at least about 25 wt % of $C_6$ to $C_9$ aliphatic and cycloaliphatic hydrocarbon comprising contacting said stream under reforming conditions with a type L zeolite catalyst in which the crystals are cylindrical and have an average length of 0.6 micron or less and an average length: diameter ratio of less than about 0.5, said catalyst containing at least one catalytically active Group VIII metal of the Periodic Table and from about 0.1 to 2 wt % of halogen, and recovering a reformate wherein less than about 20 wt % of the aromatics content of said reformate comprises aromatics containing nine or more carbon atoms.

The invention further provides a process for enhancing the catalytic activity of a crystalline type L zeolite catalyst in which the crystals are cylindrical and have an average length of 0.6 microns or less and an average length: diameter ratio of less than about 0.5, said catalyst containing at least one catalytically active Group VIII metal of the Periodic Table and from about 0.1 to 2 wt % of halogen, said processing comprising: a) contacting said catalyst with a gaseous stream comprising water, a source of chlorine, oxygen and an inert gas under oxychlorination conditions comprising a temperature of from about 450° C. to 550° C. and a partial pressure of chlorine derived from the source of chlorine which is greater than about 0.03 psia for a time sufficient to form oxyhalides of said metal; b) contacting the chlorinated catalyst with a gaseous stream containing water, oxygen and an inert gas under chlorine removal conditions comprising a temperature of about 450° to 550° C. and for a time effective to lower the chlorine content of the catalyst to about 2 wt % or less; and c) contacting the catalyst of reduced chlorine content with a gaseous stream containing an inert gas and hydrogen under reducing conditions including a temperature in the range of about 350° C. to 550° C. for a time effective to reduce metal in the catalyst to the metallic state.

The catalysts of this invention are selective towards the production of reformates having a high content of light $C_6$ to $C_8$ aromatics while at the same time producing less of the heavier $C_9$ and $C_{10}$ aromatics.

DETAILED DESCRIPTION OF THE INVENTION

Figure 1:
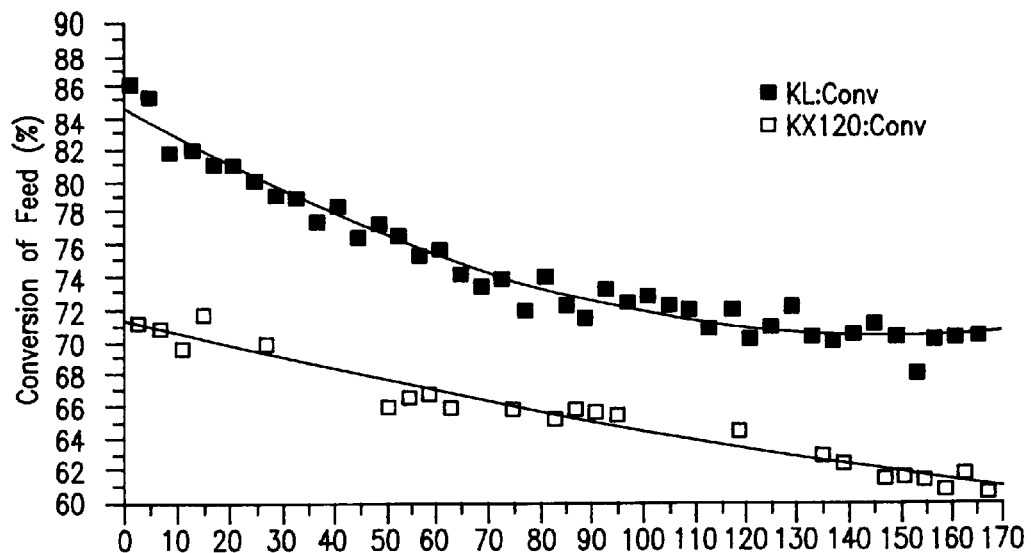
FIG. 1 is a graph plotting the % conversion of naphtha feed vs. reforming time for a catalyst of the invention and a conventional reforming catalyst.

Zeolite L aluminosilicates which are useful as support material for the catalysts of the present invention are the small particle size cylindrically shaped crystallites such as disclosed in the above referenced U.S. Pat. Nos. 5,486,498 and 5,491,119. They are generally prepared by the hydrothermal treatment of a synthesis mixture containing water, a source of potassium, a source of $Al_2O_3$, a source of $SiO_2$ and up to about 0.1 wt %, based on the weight of the synthesis mixture, of a source of divalent cation (M") selected from the group consisting of magnesium, calcium, barium, manganese, chromium, cobalt, nickel and zinc.

Preferred synthesis mixtures generally have a composition falling within the following molar ratios (expressed as oxides):

$(M'_2O+M''_{2/n}O)/SiO_2=0.18-0.36$ $H_2O/(M'_2O+M''_{2/n}O)=25-90$ $SiO_2/Al_2O_3=5-15$ $M'_2O/(M'_2O+M''_{2/n}O)=0.9-0.9999$ wherein M' is an alkali metal, preferably potassium or a mixture of potassium and sodium, M" is one or a mixture of the divalent metals described above, and n is the valence of M". The Zeolite L of the invention is prepared by hydrothermal heating of the synthesis mixture at a temperature of about 75° C. to 250° C. for a period of from about 10 to 150 hours, followed by recovery, drying and optional calcining of the resulting crystalline zeolite L product.

These zeolite L products are characterized by a cylindrical shape having relatively flat basal planes and relatively short channels within the zeolite crystalline structure. The length of the crystallite walls is generally in the range of from about 0.1 to 0.6 microns, more preferably from about 0.1 to 0.3 microns and the diameter is generally from about 0.3 to 1.5 microns, more preferably from about 0.4 to less than 1.0 micron. The average length: diameter ratio of these crystallites may generally range from about 0.05 to about 0.5, more preferably from about 0.1 to about 0.4.

The zeolite L is made catalytically active by incorporating catalytic quantities of at least one Group VIII metal and halogen into the channel structure of the zeolite L.

The Group VIII noble metals which are necessary for catalytic activity are those metals from Group VIII of the Periodic Table of Elements which are selected from osmium, ruthenium, rhodium, indium, palladium and platinum. Preferably, the metals which are employed herein are platinum, rhodium or iridium, and most preferably platinum. The metals may be present in any combination desired. Rhenium, a Group VIIB metal, may also be present so long as at least one Group VIII noble metal is present.

The amount of Group VIII noble metal present in the catalyst will be an effective amount and will depend, for example, on required catalyst activity, ease of uniform dispersion, and the crystal size of the type L zeolite. Crystal size limits the effective catalyst loading since highly loaded crystals of zeolite which have a large dimension parallel to the channels could be easily lead to pore plugging during operation as the noble metal agglomerates inside the channels. Generally, however, the level of metal present will range from about 0.1 to 6%, preferably 0.1 to 3.5% and more preferably 0.1 to 2.5% by weight of the catalyst. Furthermore, the amount of metal present is generally from about 0.1 to 2.0% by weight of the catalyst if the average zeolite crystallite size parallel to the channels is greater than about 0.2 micron, and from about 1.0 to 6% by weight if the average zeolite crystallite size parallel to the channels is no greater than about 0.2 micron.

The Group VIII noble metals may be introduced into the zeolite by, for example, ion exchange, impregnation, carbonyl decomposition, adsorption from the gaseous phase, introduction during zeolite synthesis, and adsorption of metal vapor. The preferably technique is ion exchange or impregnation by the so-called incipient witness method.

Halogen may be incorporated into the catalyst by combining it with a source of halogen such as alkali or alkaline earth chlorides, fluorides, iodides or bromides. Other halogen sources include compounds such as hydrogen halide, e.g., hydrogen chloride, and ammonium halides, e.g., ammonium chloride. The preferred halogen source is a source of chlorine. The amount of halogen source combined with the catalyst should be such that the catalyst contains from about 0.1 to 2 wt % halogen, more preferably from about 0.2 to about 1.5 wt % halogen. The catalyst can be combined with the halogen source at the same time as the Group VIII metal source and using similar methods as described above.

In a preferred embodiment, the zeolite L is combined with an inorganic binder material which serves as a matrix which holds the crystals together. Suitable binder materials include silica, alumina, silica-alumina and various clays. Molded prills or extrudates may be formed by mixing the zeolite L crystallites with water and the binder material to form a paste, shaping the paste to form molded prills or particulate extrudates and drying the resulting product.

Preferably the binder is added at a level such that the bound catalyst contains from about 10 to 50 wt % binder. Also, the catalyst metal and halide compound may be incorporated into the zeolite either before or after the zeolite is composited with the binder.

The resulting zeolite L is preferably calcined after drying under conditions which tend to minimize the agglomeration of the metal component present in the catalyst. Calcination is preferably carried out in air at a temperature of 200° C. to 550° C., preferably 260° C.–500° C. for a period of from about 1 to 12 hours.

In order to activate freshly prepared catalyst for use in the reforming process, it is preferably subjected to a hydrogen reduction step to reduce the metal cation to the metallic state. Reduction may be carried out by contacting the catalyst with a mixture of hydrogen and an inert gas at temperatures in the order of 350° C. to 550° C. for a period of from about 1 to 12 hours.

Freshly prepared catalyst may also be activated and halogenated by a process which includes the following essential steps:

a) contacting said catalyst with a gaseous stream comprising water, a source of chlorine, oxygen and an inert gas under oxychlorination conditions comprising a temperature of from about 450° C. to 550° C. and a partial pressure of chlorine derived from the source of chlorine which is greater than about 0.03 psia for a time sufficient to form oxyhalides of said metal;

b) contacting the chlorinated catalyst with a gaseous stream containing water, oxygen and an inert gas under chlorine removal conditions comprising a temperature of about 450° C. to 550° C. and for a time effective to lower the chlorine content of the catalyst to about 2 wt % or less; and c) contacting the catalyst of reduced chlorine content with a gaseous stream containing an inert gas and hydrogen under reducing conditions including a temperature in the range of about 350° C. to 550° C. for a time effective to reduce metal in the catalyst to the metallic state.

The described catalyst may then be used in a reforming or aromatization process. During these reactions, the catalyst gradually loses its effectiveness. The two major reasons are considered to be the production of carbonaceous deposits ("coke") and the agglomeration of the catalytic Group-VIII metal. The process steps outlined below provide a method for removing the coke and redispersing the metal in such a form that the catalyst is again effective.

The process steps described below, excepting the then-extraneous coke-burn step, may also be used to distribute the Group-VIII metal throughout the zeolite before it is ever contacted with a feedstock.

At the beginning of the regeneration procedure, the reactor containing the catalyst may be filled with hydrocarbon feedstock, aromatic products from the dehydrocyclization reaction, and minor amounts of hydrogen and light hydrocarbons. The reactor is under the temperature and pressure conditions employed in the dehydrocyclization procedure. It may be appropriate to purge the catalyst bed with hydrogen or a mixture of hydrogen and light hydrocarbons to remove the feed and product hydrocarbons. After the hydrogen or hydrogen and light hydrocarbon purge, the catalyst bed may then be purged with a dry or wet, substantially inert gas, preferably nitrogen.

During one or both of the hydrogen purge and inert gas purge operations, the catalyst may be cooled to an appropriate initiation temperature for the coke burn cycle to follow. This cooling obviously may be accomplished by regulating the temperature of the hydrogen, recycle gas or nitrogen admitted to the catalyst bed. This initiation temperature preferably is less than about 900° F., more preferably less than about 850° F.

The coke burn step is accomplished by contacting the catalyst with a gas stream containing oxygen at a temperature in the range of about 400° C. to 600° C. for a period of time sufficient to burn coke of the deactivated catalyst and convert the Group VIII metal to agglomerated particles. The preferred initial coke burn temperature is at least about 830° F. and the temperature is gradually increased up to a preferred temperature of about 925° to 975° F. To assure substantially complete combustion of the coke on the catalyst and thereby assure that the pores of the final regenerated catalyst will be substantially free of coke deposits, the catalyst preferably is held at the final coke burn temperature and final coke burn oxygen partial pressure for at least about two hours.

The decoked catalyst is then reactivated by subjecting it to activation steps (a), (b) and (c) as described above. In addition, the decoked catalyst may be reduced with hydrogen prior to step (a), in which case the de-coked catalyst is contacted with a gaseous stream containing inert gas and hydrogen under reducing conditions including a temperature in the range of about 350° C. to 550° C. for a period of time sufficient to reduce the Group VIII metal.

The regeneration steps which are used in the process of this invention are generally analogous to those disclosed in U.S. Pat. No. 4,914,068 and WO 94/05419.

Naphtha streams which may be reformed in accordance with this invention include light to full range $C_6$–$C_{11}$ naphtha streams containing at least 25 wt %, more preferably at least 35 wt % and most preferably at least 50 wt % of C6 to $C_9$ aliphatic and cycloaliphatic hydrocarbons and generally less than about 25 wt %, more preferably less than 20 wt %, of $C_9$–$C_{11}$ aromatic compounds. Reforming is conducted by contacting the naphtha stream in a suitable reactor with activated catalyst at a preferred temperature in the range of 800° F. to 1000° F., pressure of about 50 to 3,000 psi, hourly weight space velocities in the range of 0.5 to 3.0 and in the presence of hydrogen at a molar ratio to the feed in the range of 0 to 20, more preferably 1–10 moles of hydrogen per mole of feed naphtha.

The catalysts of the invention are highly selective towards the production of reformate having a high aromatics content, generally in excess of about 70 wt % of $C_6$ to $C_8$ aromatics (BTX). The enhanced BTX yield makes this catalyst particularly attractive for BTX production in chemical recovery processes.

Of the total aromatics produced, generally less than about 20 wt %, more preferably less than 17.5 wt % and most preferably less than 15 wt % constitutes heavy aromatics containing nine or more carbon atoms. The reformate is thus more valuable for use in reformulated gasoline where lower contents of $C_9$ and above aromatics are desired for environmental reasons.

The following examples are illustrative of the invention.

EXAMPLE 1

A catalyst of this invention was prepared as follows: Into a circulating solution of 12.8809 g of $Pt(NH_3)_4Cl_2 \cdot H_2O$, 19.74 g of 25.27 wt % KOH solution, 9.09 g of KCl and 1399.0 g of water, there was added 800.0 g of a 1/16" extrudate consisting of a 70 wt % of small particle KMgL zeolite and a 30 wt % alumina binder. After 1.5 hr, the loading solution was drained and the wet extrudate as dried at 300° F. for 5 hr and calcined at 662° F. for 2 hr. Elemental analysis of the resultant extrudate gave a 0.846% of Pt and 0.20% of Cl loading on the zeolite L support.

EXAMPLE 2

The catalyst of Example 1 was tested and coked in a pilot plant reactor using a $C_6$–$C_7$ light naphtha. After about 150 hours on oil, the coked catalyst was regenerated by a regeneration procedure involving the following steps:

(1) cool down to 833° F. in $H_2$, (2) coke burn between 833 and 950° F., (3) $H_2$ reduction at 950° F., (4) wet oxychlorination with HCl and $O_2$ at 950° F., (5) wet air soak at 950° F., (6) wet $N_2$ purge at 950° F., (7) wet $H_2$ reduction at 950° F. and (8) dry $H_2$ cool down and $N_2$ purge.

EXAMPLE 3

A full range $C_6$–$C_{11}$ naphtha was hydrofined and subsequently treated with massive Ni and 4D sieve for removing sulfur to about 4 ppb sulfur in the feed. G. C. analysis of this treated feed gave the following composition: $C_5$ (0.26%), $C_6$ (5.85%), $C_7$ (18.99%), $C_8$ (22.35%), $C_9$ (21.60%), $C_{10}$ (10.37%), $C_{11}$ (2.93%), $A_6$ (0.32%), $A_7$ (3.13%), $A_7$ (3.13%), $A_8$(5.33%), $A_9$(8.07%) and $A_{10}$(0.80%). Using this liquid feed, two experiments were conducted in the lab units: one with an alumina-bound regenerated 0.85% Pt/KMgL catalyst of Example 2, and the other with a sulfided Pt—Re/$Al_2O_3$—Cl catalyst (i.e. KX-120 catalyst). Reaction conditions were 860° F., 1 WHSV (relative to catalyst charge), 100 psig, 6 $H_2$/feed (mole/mole) and over a period of 165 hr. Table 1 summarizes the experimental results of the time average values.

TABLE 1

| Ex | Catalyst | Feed Conv | $A_6$–$A_8$ Select $C_4$ | $A_6$ | $A_7$ | $A_8$ | $A_9$ | $A_{10}$ | $C_1$ $C_4$ | $C_4^-$ |
|---|---|---|---|---|---|---|---|---|---|---|
| 2 | Pt/MgKL | 74.6 | 76.4 | 7.0 | 26.0 | 24.0 | 4.2 | 4.8 | 10.9 | |
| Cont. | KX-120 | 65.7 | 51.3 | 3.0 | 12.9 | 17.7 | 6.4 | 3.0 | 19.7 | |

Time Avg. Yield of Aromatics shown above columns $A_6$ through $C_4^-$.

Figure 2:
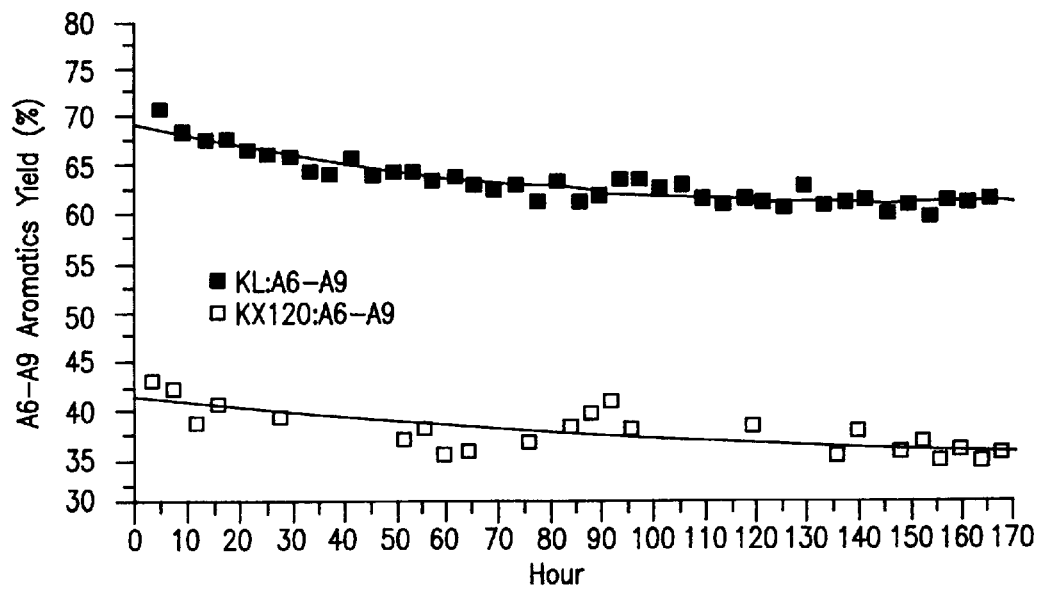
FIG. 2 is a graph plotting the yield of $C_6$ to $C_9$ aromatics vs. reforming time for a catalyst of this invention and a conventional reforming catalyst.

As can be seen in FIGS. 1 and 2, the regenerated Pt/KMgL catalyst was more stable than that observed with the KX-120 catalyst in terms of converting the feed and producing $A_6$–$A_9$ aromatics. Also, of the total aromatics produced, only about 13.6 wt % constituted $A_9$ and $A_{10}$ aromatics using the catalyst of Example 2 whereas about 21.7 wt % of the aromatics produced using the control catalyst constituted $A_9$ and $A_{10}$ aromatics.

What is claimed is:

1. A process for reforming a $C_6$ to $C_{11}$ naphtha stream containing at least about 25 wt % of $C_6$ to $C_9$ aliphatic and cycloaliphatic hydrocarbons comprising contacting said stream under reforming conditions with a crystalline L zeolite catalyst in which the crystals are cylindrical and have an average length of 0.6 microns or less, said catalyst containing at least one catalytically active Group VIII metal of the Periodic Table and, from about 0.1 to 2 wt % of halogen, and recovering a reformate wherein in excess of about 70 wt % of the aromatics content of said reformate comprises $C_6$ to $C_8$ aromatics and less than about 20 wt % of the aromatics content of said reformate comprises aromatics containing nine or more carbon atoms.

2. The process of claim 1 wherein less than about 17.5 wt % of the aromatics content of said reformate comprises aromatics containing nine or more carbon atoms.

3. The process of claim 2 wherein less than about 15 wt % of the aromatics content of said reformate comprises aromatics containing nine or more carbon atoms.

4. The process of claim 1 wherein said Group VIII metal comprises platinum.

5. The process of claim 1 wherein said Group VIII metal is present in said catalyst at a level of from about 0.1 to 6 wt %.

6. The process of claim 1 wherein said halogen is chlorine, bromine or fluorine.

7. The process of claim 1 wherein said halogen is chlorine.

8. The process of claim 1 wherein said catalyst contains from about 0.2 to 1.5 wt % halogen.

9. The process of claim 1 wherein said crystals are held together with an inorganic binder material selected from the group consisting of silica, alumina, silica-alumina and clay.

10. The process of claim 9 wherein said binder is alumina.

11. The process of claim 1 wherein said crystals have an average length of about 0.1 to 0.3 microns.

12. The process of claim 1 wherein said crystals have an average length: diameter ratio of about 0.1 to 0.4.

13. The process of claim 1 wherein said cylindrical crystals have an average length: diameter ratio of less than about 0.5.

14. The process of claim 1 wherein the content of aromatics containing nine or more carbon atoms present in said reformate is less than where said reforming process is carried out using an otherwise identical catalyst, but free of said halogen.

15. A process for reforming a $C_6$ to $C_{11}$ naphtha stream containing at least about 25 wt % of $C_6$ to $C_9$ aliphatic and cycloaliphatic hydrocarbons comprising contacting said stream under reforming conditions with an activated catalyst and recovering a reformate wherein less than about 20 wt % of the aromatics content of said reformate comprises aromatics containing nine or more carbon atoms, said activated catalyst comprising a crystalline L zeolite in which the crystals are cylindrical and have an average length of 0.6 microns or less and average length: diameter ratio of less than about 0.5, said zeolite containing at least one catalytically active Group VIII metal of the Periodic Table, said activated catalyst prepared by a) contacting said zeolite with a gaseous stream comprising water, a source of chlorine, oxygen and an inert gas under oxychlorination conditions comprising a temperature of from about 450° to 550° C. and a partial pressure of chlorine derived from the source of chlorine which is greater than about 0.03 psia for a time sufficient to form oxychlorides of said metal;

b) contacting the chlorinated zeolite with a gaseous stream containing water, oxygen and an inert gas under chlorine removal conditions comprising a temperature of about 450° C. to 550° C. and for a time effective to lower the chlorine content of the zeolite to about 2 wt % or less; and c) contacting the zeolite of reduced chlorine content with a gaseous stream containing an inert gas and hydrogen under reducing conditions including a temperature in the range of about 350° C. to 550° C. for a time effective to reduce metal in the zeolite to the metallic state.

16. The process of claim 15 wherein said catalyst is a coke-containing, partially deactivated catalyst and wherein, prior to step (a), a substantial portion of said coke is removed by contacting said catalyst with a gas stream containing oxygen at a temperature in the range of about 400° C. to 600° C. for a time sufficient to burn coke off the catalyst.

17. The process of claim 16 wherein prior to step (a), said de-coked catalyst is contacted with a gaseous stream containing inert gas and hydrogen under reducing conditions including a temperature in the range of about 350° C. to 550° C. for a time sufficient to reduce said metal.

18. The process of claim 15 wherein said zeolite contains from about 0.1 to 2 wt % halogen prior to said activation steps.

* * * * *